US008156096B2

(12) United States Patent
Meiresonne

(10) Patent No.: US 8,156,096 B2
(45) Date of Patent: **\*Apr. 10, 2012**

(54) SUPPLIER IDENTIFICATION AND LOCATOR SYSTEM AND METHOD

(76) Inventor: Michael Meiresonne, East Grand Rapids, MI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/241,554

(22) Filed: Sep. 23, 2011

(65) Prior Publication Data

US 2012/0011107 A1    Jan. 12, 2012

Related U.S. Application Data

(63) Continuation of application No. 12/341,857, filed on Dec. 22, 2008, now Pat. No. 8,051,059, which is a continuation of application No. 10/421,268, filed on Apr. 23, 2003, now Pat. No. 7,483,872, which is a continuation-in-part of application No. 09/938,163, filed on Aug. 23, 2001.

(51) Int. Cl.
*G06F 7/00* (2006.01)
*G06F 17/30* (2006.01)
(52) U.S. Cl. .................. 707/705; 707/707; 707/710
(58) Field of Classification Search .................. 707/705, 707/706, 707, 709, 710, 711, 769
See application file for complete search history.

(56) References Cited

U.S. PATENT DOCUMENTS

| 5,740,425 | A | 4/1998 | Povilus |
| 6,058,376 | A * | 5/2000 | Crockett .................. 705/36 T |
| 6,567,800 | B1 | 5/2003 | Barrera et al. |
| 6,643,641 | B1 | 11/2003 | Snyder |
| 6,662,192 | B1 | 12/2003 | Rebane |
| 7,065,520 | B2 | 6/2006 | Langford |
| 7,559,034 | B1 * | 7/2009 | Paperny et al. ............... 715/803 |
| 2002/0032677 | A1 | 3/2002 | Morgenthaler et al. |
| 2002/0075299 | A1 * | 6/2002 | Tobin et al. .................... 345/744 |
| 2002/0152222 | A1 | 10/2002 | Holbrook |
| 2002/0194151 | A1 | 12/2002 | Fenton et al. |
| 2002/0194601 | A1 | 12/2002 | Perkes et al. |
| 2003/0001903 | A1 * | 1/2003 | Duffy ............................ 345/810 |
| 2003/0004837 | A1 | 1/2003 | Myers et al. |
| 2004/0044600 | A1 * | 3/2004 | Chu et al. ......................... 705/34 |
| 2004/0073538 | A1 * | 4/2004 | Leishman et al. ................ 707/3 |
| 2006/0149721 | A1 | 7/2006 | Langford |

OTHER PUBLICATIONS www.superpages.com, May 30, 2007, p. 1-2 and 1-5.
www.archive.org version of the www.contractpackage.com web site dated Sep. 14, 2000, and related linked pages.

(Continued)

*Primary Examiner* — Don Wong
*Assistant Examiner* — Merilyn Nguyen
(74) *Attorney, Agent, or Firm* — Price Heneveld LLP

(57) ABSTRACT

A supplier identification and locator system in that allows a user to identify a supplier of goods or services over the Internet; the system includes at least one directory Web site having a domain name that is at least partially descriptive of a class of goods or services. The directory Web site has a plurality of links that access suppliers' Web sites; a supplier descriptive portion located substantially adjacent to the link; a descriptive title portion substantially corresponding to the class of goods or services described in the domain name; a rollover window that displays information about at least one supplier; and an input receiving area where a user inputs data and ranked search results are displayed.

20 Claims, 9 Drawing Sheets

OTHER PUBLICATIONS www.archive.org version of the www.contractpackage.com web site dated Jan. 24, 2001, and related linked pages.
www.archive.org version of the www.contractpackage.com web site dated Feb. 1, 2001, and related linked pages.
www.archive.org version of the www.contractpackage.com web site dated Feb. 7, 2001, and related linked pages.
www.archive.org version of the www.contractpackage.com web site dated Mar. 2, 2001, and related linked pages.
www.archive.org version of the www.contractpackage.com web site dated Apr. 5, 2001, and related linked pages.
www.archive.org version of the www.contractpackage.com web site dated May 16, 2001, and related linked pages.
www.archive.org version of the www.contractpackage.com web site dated May 17, 2001, and related linked pages.
www.archive.org version of the www.contractpackage.com web site dated May 18, 2001, and related linked pages.
www.archive.org version of the www.contractpackage.com web site dated May 19, 2001, and related linked pages.
www.archive.org version of the www.contractpackage.com web site dated May 25, 2001, and related linked pages.
www.archive.org version of the www.contractpackage.com web site dated Jul. 21, 2001, and related linked pages.
http://web.archive.org/web/19981212034238/http://www.yahoo.com/ (Web page archived Dec. 12, 1998).
http://web.archive.org/web/19981212021045/http://shopguide.yahoo.com/ (Web page archived Dec. 12, 1998).
http://web.archive.org/web/19981212012608/http://apparel.shopping.yahoo.com/ (Web page archived Dec. 12, 1998).
http://web.archive.org/web/199812070130111http://apparel.shopping.yahoo.com/ Apparel/Men__s__and__Boys__Pants/ (Webpage archived Dec. 7, 1998).
http://web.archive.org/web/19981202083627fw__/http://www.llbean.com/bin/homepage.
http://web.archive.org/web/19981212023239/http:/ /www.bizrate.com/.
http://web.archive.org/web/19980421074244/http://www.bizrate.com/display.pl?t=cat&b=cat__apparel.
http://web.archive.org/web/19980421 075357 /http://www.bizrate.com/search.pl?cat=Apparel%20:%20Accessories.
BPAI Decision on Appeal of U.S. Appl. No. 09/938,163, filed Nov. 28, 2011.

* cited by examiner

SUPPLIER IDENTIFICATION AND LOCATOR SYSTEM AND METHOD

CROSS-REFERENCE TO RELATED APPLICATIONS

This application is a continuation of U.S. patent application Ser. No. 12/341,857, now U.S. Pat. No. 8,051,059, entitled SUPPLIER IDENTIFICATION AND LOCATOR SYSTEM AND METHOD, filed Dec. 22, 2008, the disclosure of which is hereby incorporated by reference in its entirety. U.S. application Ser. No. 12/341,857 is a continuation of U.S. patent application Ser. No. 10/421,268 entitled SUPPLIER IDENTIFICATION AND LOCATOR SYSTEM AND METHOD, filed Apr. 23, 2003, now U.S. Pat. No. 7,483,872 B2, the disclosure of which is hereby incorporated by reference in its entirety. U.S. Pat. No. 7,483,872 B2 is a continuation-in-part of U.S. patent application Ser. No. 09/938,163 entitled METHOD, PROCESS, AND SYSTEM FOR SEARCHING FOR AND IDENTIFYING SOURCES OF GOODS AND/OR SERVICES OVER THE INTERNET, filed Aug. 23, 2001, the disclosure of which is hereby incorporated by reference in its entirety.

BACKGROUND OF THE INVENTION

The present invention generally relates to the design of Web sites and interrelationships between the Web sites.

Currently, for anyone who has tried to locate specific information or a specific set of suppliers of a particular good or service over the Internet, a user has to use a typical search engine, such as yahoo.com, excite.com or lycos.com. Unfortunately, Internet search engines are unable to ask a series of pointed questions to help a user focus his or her search. Therefore, they must rely on the particular search engine's algorithm in order to rank the millions of web pages thereby determining the Web sites that best fit a given search term the user has inputted into the search engine. Thus, users typically select Web sites listed at the top of the list provided by the search engine. Consequently, Web site designers often design their Web sites with the goal of having their Web site listed at the top of search engine lists thereby increasing the number of hits/visitors to their Web site. However, a particular search engine's increasing the number of hits/visitors to their Web site. However, a particular search engine's algorithm is typically a closely guarded trade secret. Nevertheless, most major search engines follow the same general rules.

Generally, a particular search engine's algorithm, at least preliminarily, ranks various web pages based upon the location and frequency of keywords on a web page. For example, pages containing a particular user search term, the domain name or in the header/title html tags, are typically more relevant than others to the topic being searched by the user. Consequently, web pages having a particular search term in the header tag are often assumed to be more relevant by the search algorithm. Search engines also check to see if a user's search term appears near the top of the page. The search engine's algorithm assumes that any page relevant to the topic will mention the user's search term in the headline or in the first few paragraphs of the text.

Frequency is another major factor search engines use to determine relevancy of a web page to a specific user's search term. A search engine will analyze how frequently keywords appear in relation to other words on a web page, a document on the World Wide Web. The World Wide Web is a system of Internet servers. A server is a computer or device in a network that is used to provide services to other computers or devices in the network. The web pages where the user's search term appears with a higher frequency are often deemed more relevant than other web pages.

Some search engines utilize other ingredients to further qualify the typical location and frequency algorithm method described above. One of the most often used fields that are searched is a Web site's metatags. However, not all search engines read metatags. Metatags are simply a placeholder for storing information that may or may not be processed by an HTTP server or indexed by a search engine.

The final main feature most search engines use to rank and display the most relevant web pages to the user's search query includes an analysis of how pages link to each other. In this manner, a search engine can better determine what a Web site is about and whether the Web site deserves a higher ranking. Links to other related Web sites outside of a given Web site typically result in a higher ranking. Some search engines also screen out attempts by computer users to build into their Web sites false links, which the Web site designer would include in an attempt to boost their rankings.

Unfortunately, a person/user attempting to locate goods or services on a particular topic using a conventional search engine may be successful in locating a few Web sites corresponding to an insignificant number of the goods and services providers corresponding to their area of interest. Searching using this technique is very laborious and time consuming, especially for a professional or business person who needs quick access to information about various suppliers of goods and services in order to compare the various suppliers and decide which supplier would best fulfill their needs. Oftentimes, a conventional search will reveal only two or three suppliers of particular goods, but will not locate the Web sites of many other commercial suppliers of a good or service whose Web sites may not achieve, for whatever reason, as high ranking on a particular search engine.

Consequently, there is a significant need for a goods and service directory, which can easily be located using a conventional search engine accessible using a computer, which is a programmable, usually electronic, device that can store, retrieve, and process data, to access the conventional search engine on the Internet, which is an electronic communications network that connects computer networks and organizational computer facilities around the world. There is also a significant need for the directory to include numerous links to a variety of goods and services suppliers related to a particular topic while providing easy and quick navigation to and from any number of supplier Web sites so that the user can find out more detailed information than that which is provided by the directory.

SUMMARY OF THE INVENTION

The present invention includes a supplier identification and locator system whereby a user can identify a supplier of goods or services over the Internet. The supplier identification and locator system includes at least one directory Web site with a directory Web site domain name. The directory Web site domain name typically is at least partially descriptive of a class of goods or services. The directory Web site also typically has a plurality of links where activation of a link accesses a supplier's Web site; a supplier descriptive portion located substantially adjacent to the corresponding supplier link; a descriptive title portion substantially corresponding to the description of the class of goods or services described by the directory Web site domain name; and a rollover window that displays information about at least one of the suppliers corresponding to a supplier identified by at least one of the supplier links.

Another embodiment of the present invention includes a method to identify a supplier of goods and services over the Internet. The method typically includes providing for a user at least one directory Web site with a directory Web site domain name where the directory Web site domain name is at least partially descriptive of a class of goods or services. The directory Web site also typically has a plurality of links where activation of a link accesses a supplier's Web site; a supplier descriptive portion substantially adjacent to the corresponding supplier link; a descriptive title portion substantially corresponding to the description of the class of goods or services described by the directory Web site domain name; and a rollover window that displays information about at least one of the suppliers corresponding to a supplier identified by at least one of the supplier links.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
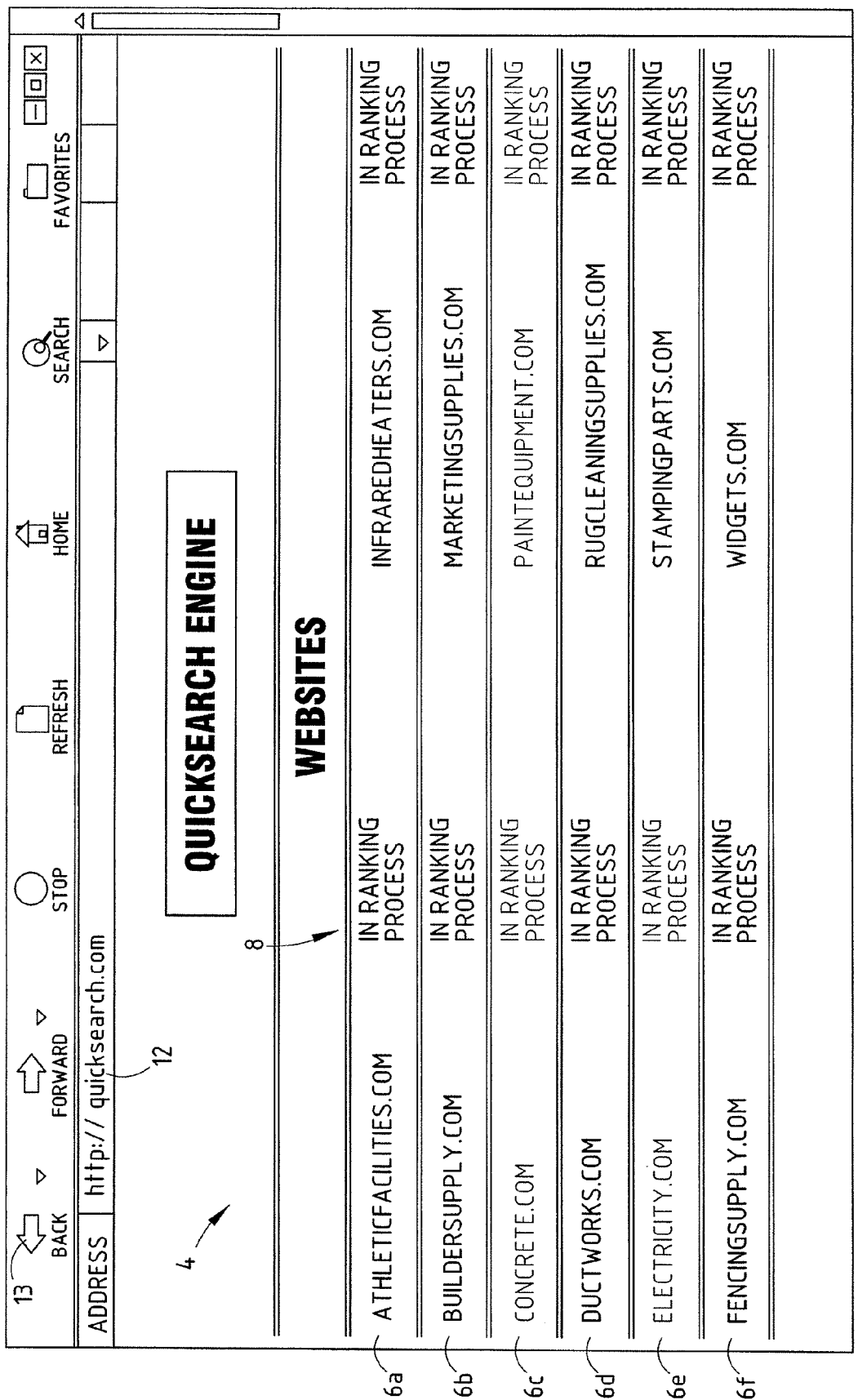
FIG. 1 shows a main Internet browser window display showing a layout of a sample home page/main index of directory listings according to an embodiment of the present invention.
Figure 4:
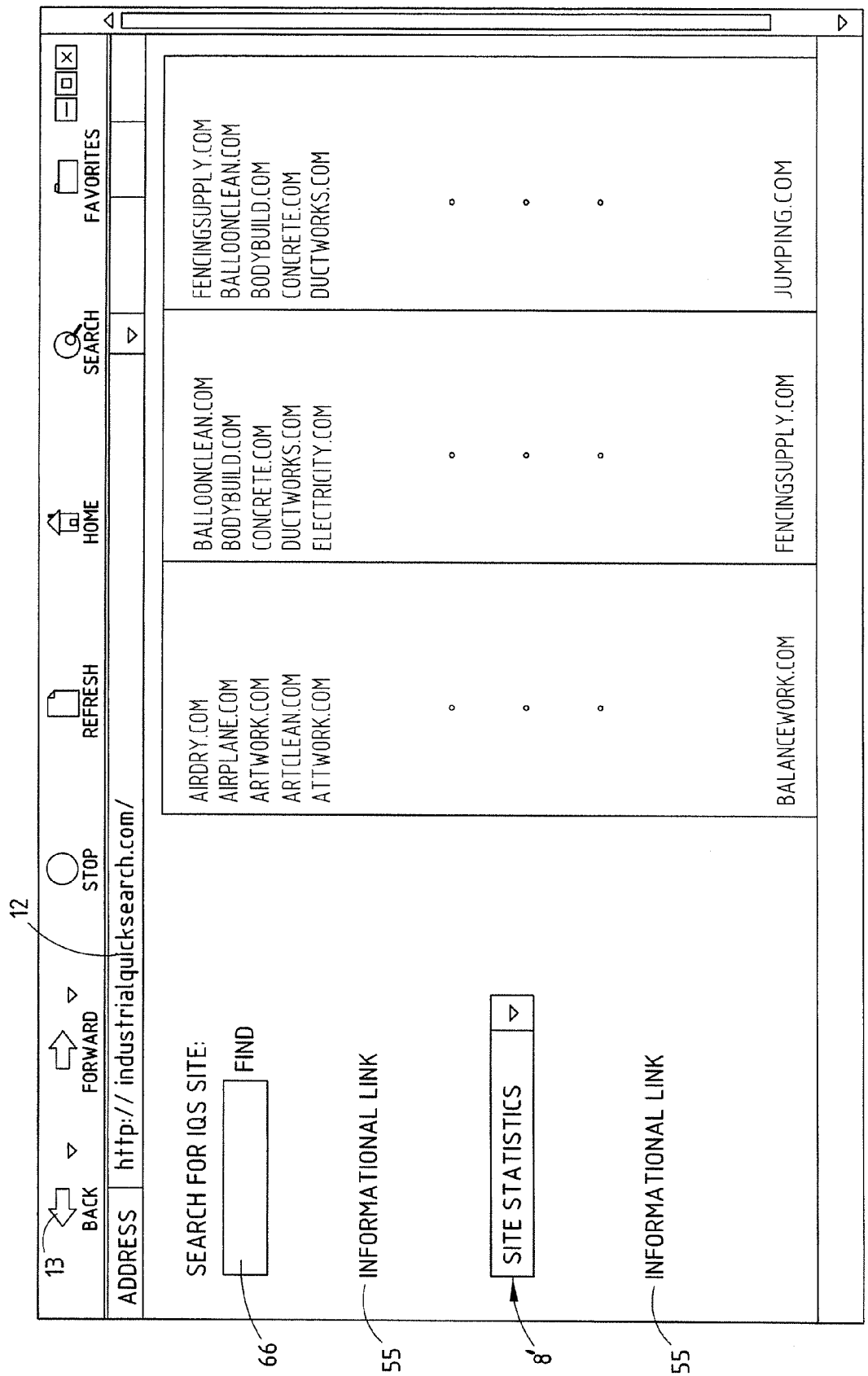
FIG. 4 shows an alternative main Internet browser window display according to an embodiment of the present invention showing a layout of another sample home page/main index of directory listings that also incorporate a search feature.

As shown in FIG. 1, a homepage or overall goods and services index of directories 4 generally includes a series of at least partially descriptive domain names of goods and/or services 6a, 6b, 6c, 6d, etc., where each domain name is a link to a detailed directory of goods and services that are described in the domain name 6a, 6b, 6c, 6d, etc. A ranking link 8, which may also be included on the index of directories 4 as separate links, which when activated, links a user to a web page that provides detailed ranking and user hit information corresponding to at least partially descriptive domain names of the related goods and/or services. The ranking links 8', may also be optionally displayed in a drop-down list, or other similar manner, as shown in FIG. 4. This ranking and/or visitor session(s) information allows a user to determine how often other users have visited this site or otherwise used the directory. This may be important for someone searching for a goods or services provider to estimate how useful other users have found the information. The information may also be helpful to a goods or services provider who is thinking about purchasing advertising on a given directory of goods or services Web site 10 (see FIG. 2). More users utilizing the directory of goods and services Web site 10 results in more value to the subscriber because of the increased chance his/her advertisement/listing will be viewed or his/her company's Web site link 18 will be activated.

One way to identify suppliers of a class of goods or services, according to the invention, involves utilizing a computer to access Web sites of suppliers. A user may utilize a conventional search engine. In doing so, a user searching for companies offering particular goods and services would insert a search strategy or term, typically a description of the type of good or service the user is searching for, such as, in this example, widgets. In this example, a user searching for a widget would insert the descriptive term "widgets" into a conventional search engine, such as Yahoo® or Excite®, and the search results would, more than likely, reveal a directory constructed according to the present invention as one of the top ranked sites and provide a link to the directory, bypassing the home page.

Figure 2:
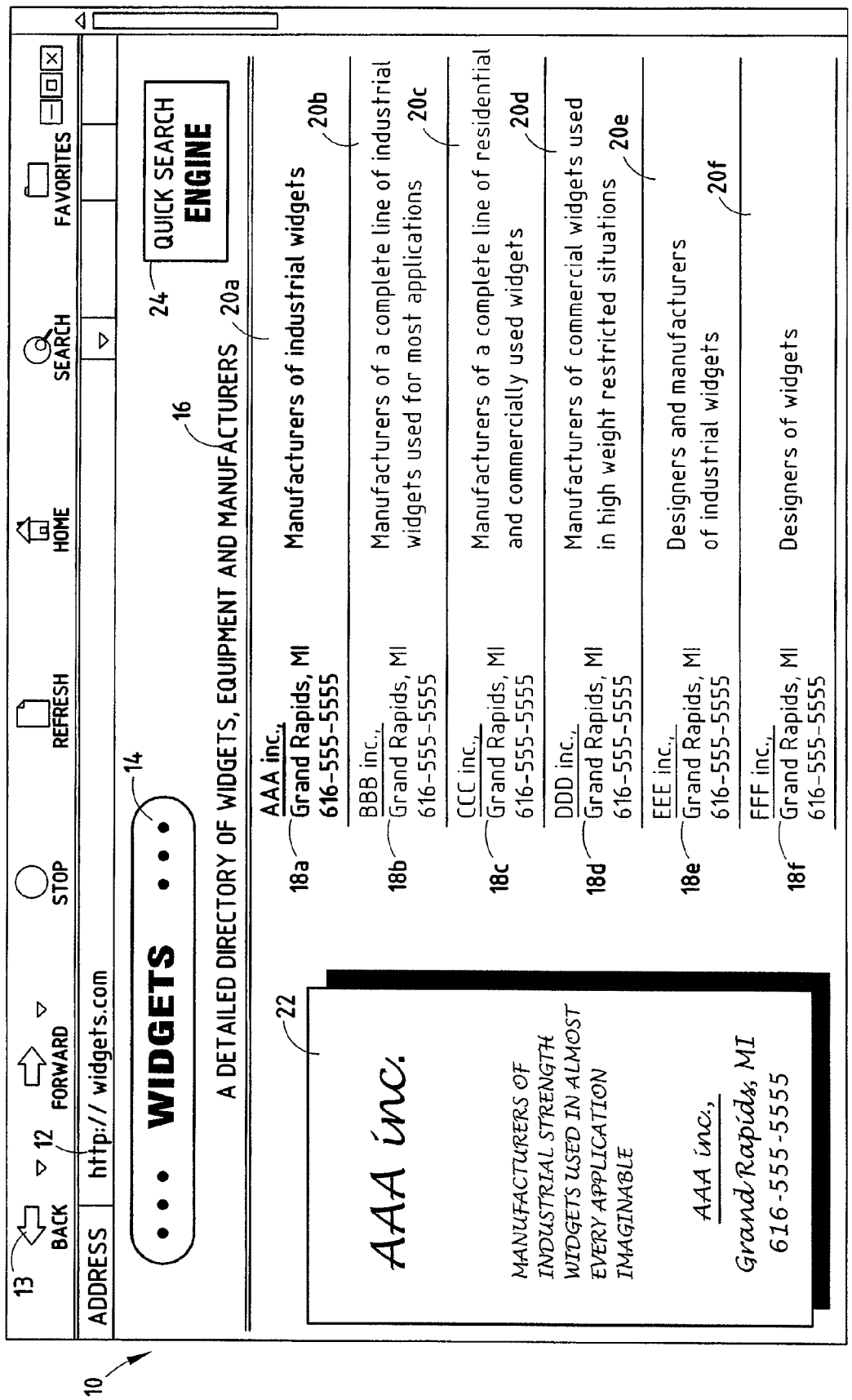
FIG. 2 shows an abbreviated main directory page for widgets, a hypothetical good, according to an embodiment of the present invention.

A directory, according to the present invention, achieves this high ranking by advantageously employing related elements in each of the areas where a "typical" search engine locates relevant information. For example, as shown in FIG. 2, if a user was searching for widgets, a widgets directory, constructed according to the present invention, employs a descriptive domain name, such as, widgets.com 12. The present invention may also employ the descriptive term or substantially similar descriptive term in the header 14 as well as the first paragraph of the text 16. The directory Web site also provides links to the Web sites of various suppliers who offer goods and services of the type described by the directory as well as a description of the supplier, including address and phone number and typically a written description about the supplier and/or the supplier's product(s) 20a, 20b, 20c, etc.

Figure 8:
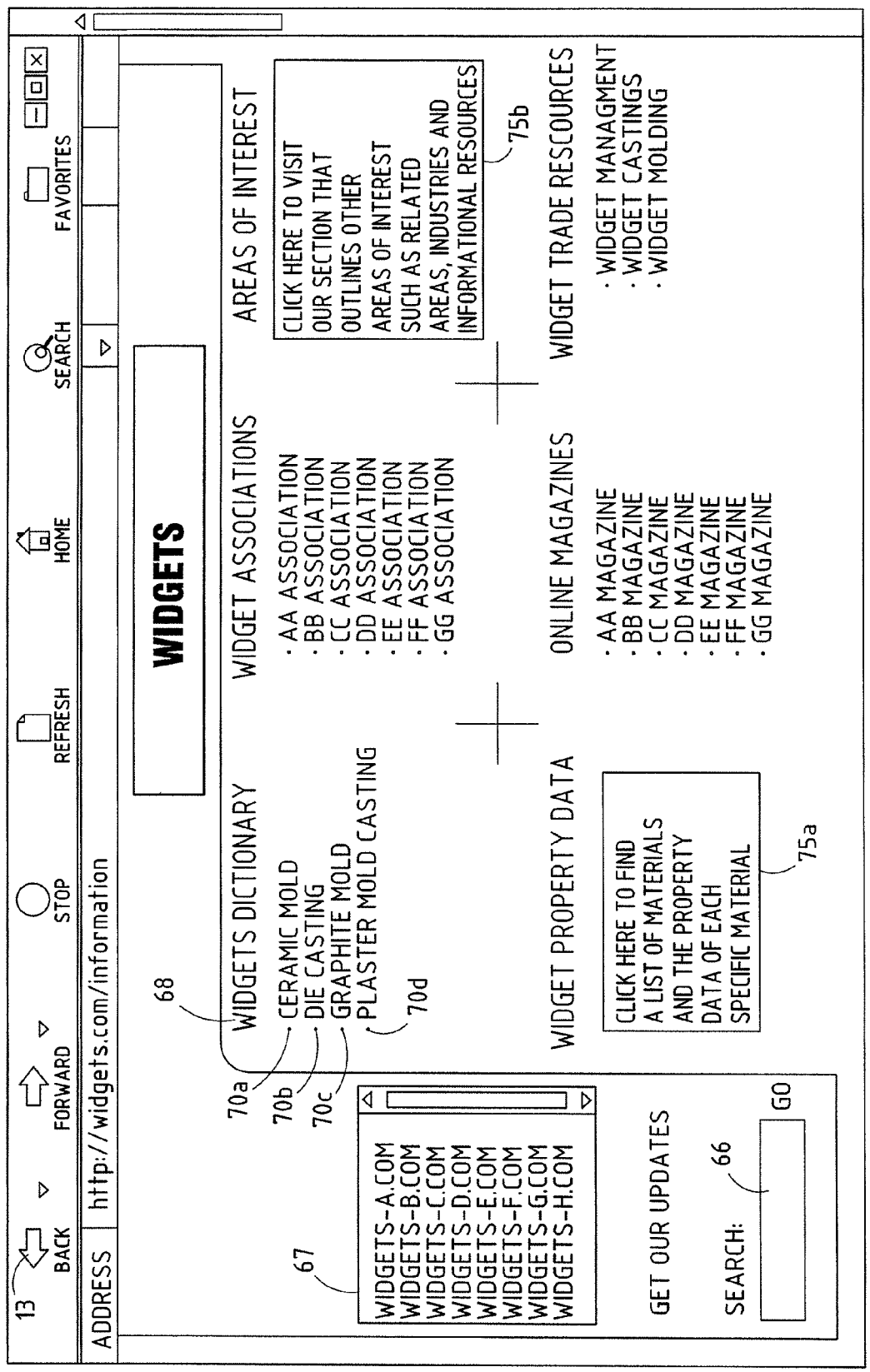
FIG. 8 shows another embodiment of a subsequent directory page.
Figure 9:
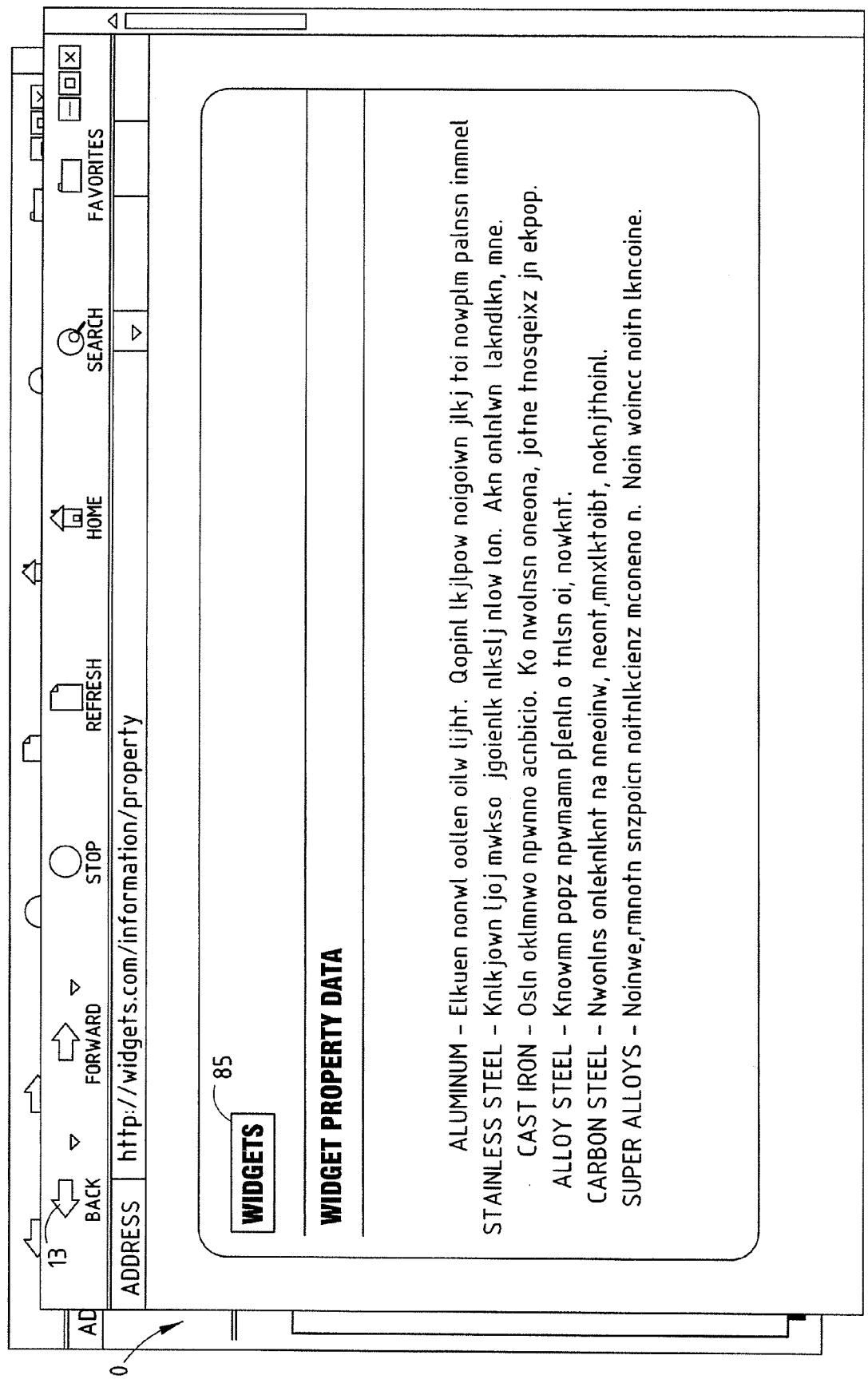
FIG. 9 shows a subsequent window according to an embodiment of the present invention, displaying an information page while the separate directory Internet browser window remains open.

The directory Web site, according to the present invention, may also contain a link or links to one or more informational Web sites/pages, which typically provide links to subsequent Web sites of information relating to the goods or services listed on the directory Web site. FIG. 8 shows an informational Web site for widgets, having a title heading 68, subject matter sub-headings 69, and links 70a, 70b, 70c, and 70d to Web page(s) containing information that may be of interest to the user, or links 75a and 75b to an informational Web site containing links that the user may then select to view a Web page of various types of information. Link 75a is typically used when the list of links under a particular title heading is too lengthy to fit on the directory Web site. Selecting a link 70a, 70b, etc. may cause a separate Internet browser window to appear as in FIG. 9. A separate browser window allows the user to navigate through the linked page displaying the detailed data/information corresponding to the selected informational links 70a, 70b, and 70c while easily returning to the informational Web site by simply closing the new window or selecting a still active separate Internet browser window, which still displays the informational Web site. Selecting links 70a, 70b, etc. may also conventionally replace the informational directory Web site with the subsequent detailed data/information Web page. The information Web page shown in FIG. 9 may also optionally contain a return link 85, which returns the user to the directory Web site 10 that contains links to Web sites of various suppliers as shown in FIG. 2. The informational directory Web site 80 also typically provides links to informational Web pages may optionally include a scrollbar 67 that may list related Web sites, supplier links, or any other link that may be of interest to the user. An input receiving locational area 66, where a user inputs identifying data, may optionally be included on the informational directory Web site 80. The data entered by the user may be any keyword search term. The search function typically searches metatag keywords in the various related goods/services directory Web sites and/or informational directory Web sites.

A master informational home page Web site containing links to any number of the individual informational directory Web sites or pages may also be utilized as another way a user could locate and enter the directory Web sites. A user might visit the master informational home page Web site and select an individual industry-specific informational directory Web site. That informational directory Web site or page typically contains a link to any number of related goods and/or services directory Web sites, thereby allowing a user to eventually reach the given goods and/or services directory Web site. This interlinking increases link popularity, which typically increases ranking on search engine results.

Any type of good or service may be indexed and searched using the present invention. While the present invention is primarily to be used in connection with offering industrial goods or services, any goods or services including goods or services such as, art dealers, toys, antiques, etc., may be indexed according to the present invention as well. Any number of supplier links, including a single supplier link, may constitute a directory web site. However, preferably, multiple supplier links are included on a directory web site. The supplier links are typically categorized into multiple sets of supplier links. The links 18a, 18b, 18c, 18d, etc., to various suppliers, are such that when a user's cursor is located over such a link, prior to activation of the link, the window 22, which can be any suitable size and may or may not have a border, displays more detailed information regarding the specific supplier of the goods or services of the directory, including the supplier's logo, without the user having to activate the link and wait for a new internet page to load into their internet browser. Information about a particular supplier may be displayed using a script language such as, Java®, JavaScript®, Flash® or other similar computer programming language of script. Streaming video or steaming audio information can also be conveyed. The rollover window is preferably located such that it is readily viewable when the user's cursor is at least substantially over any of the links 18 or the description about the supplier 20 on the directory. This also includes any other area located substantially adjacent or with the supplier's description area. If numerous links 18 are listed, more than one rollover window 22 may be utilized such that a rollover window is readily viewable whenever the user's cursor is placed over any of the links. Typically when there are many supplier links, as shown in FIGS. 1 and 4, one of a plurality of rollover windows 22 may also correspond to a set of supplier links. When a set of supplier links is substantially visible, the corresponding rollover window 22 displays information about at least one supplier from the set of supplier links. The supplier link that activates the rollover window is typically also the link that assesses the supplier.

Figure 6:
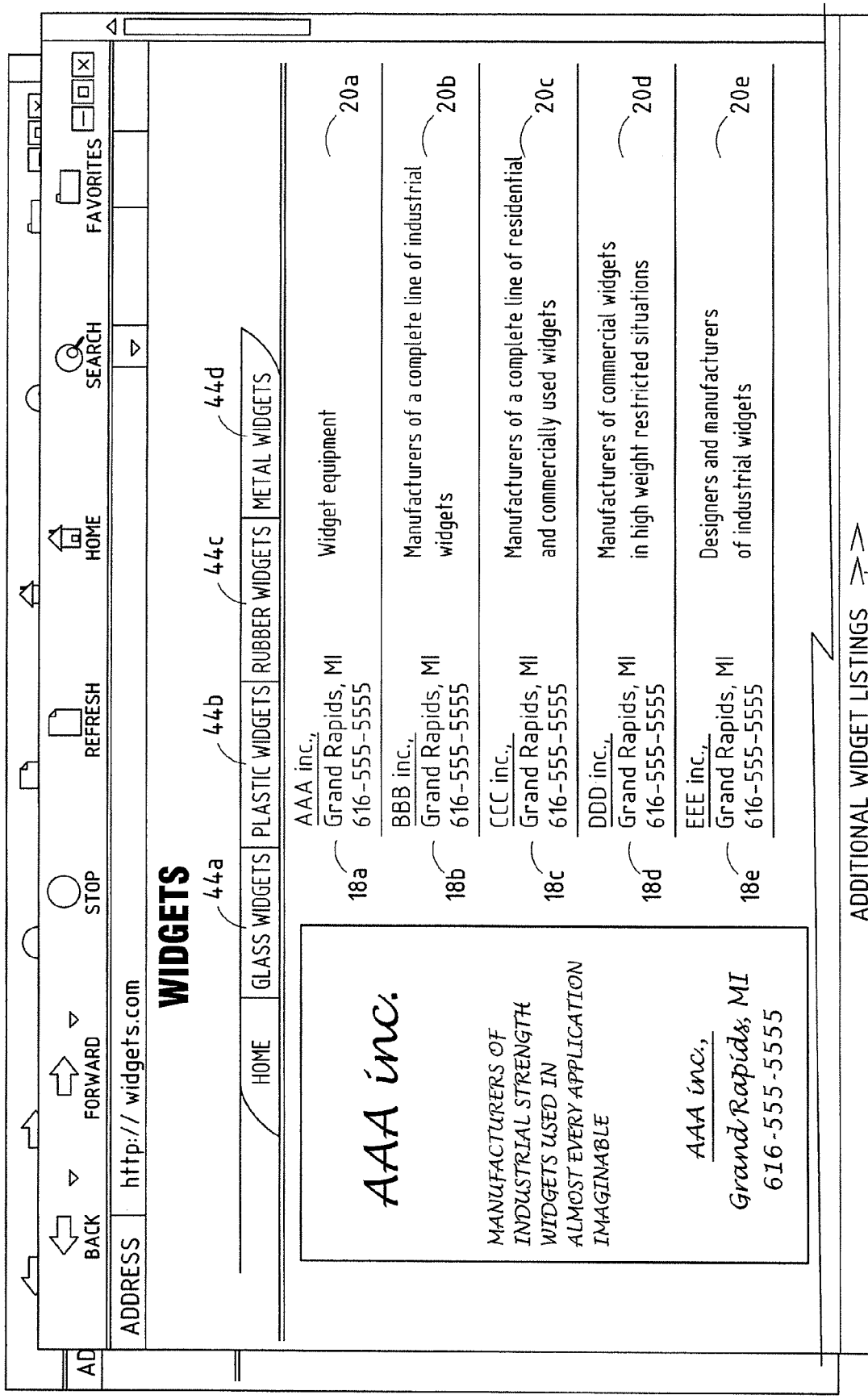
FIG. 6 shows another embodiment of a main directory page with sub-directory Web site link.
Figure 7:
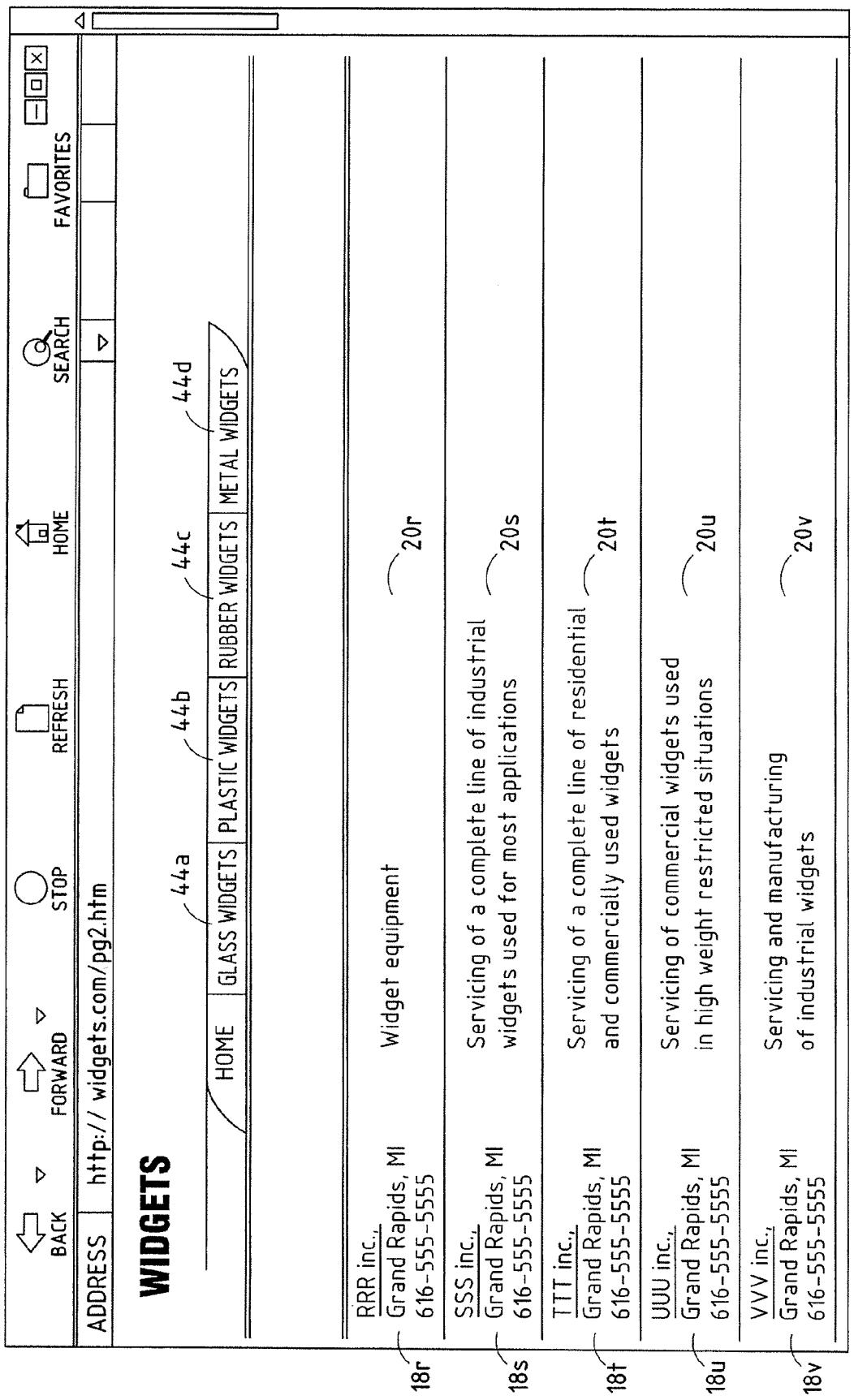
FIG. 7 shows another embodiment of a subsequent directory page without a rollover window.

The directory web site of the present invention may optionally be tiered. When the directory Web site is tiered, a first tier section of a supplier link is initially viewable in the Internet browser window and the rollover window area is typically larger than subsequent lower tiers further down the directory Web site. In this manner, advertising space in the first tier is at a premium because the supplier links in the first tier are initially displayed to the user when the directory Web site is accessed and the rollover window is typically larger. Any number of lower tiers of supplier links extends further down the directory Web site and may be viewed by scrolling down the directory Web site. Applicant presently prefers to use a three-tier system. Optionally, the directory Web site may also contain links 77 to additional directory Web pages that are subsequent pages of the directory Web site, as shown in FIG. 6. These additional directory web sites may or may not utilize a rollover window. Typically, they do not and accordingly advertising space on these sites is more economically priced, as shown in FIG. 7. If there are too many supplier links and other information to be downloaded to the primary directory web site, the Web site will take too long to load and some users will not wait until the information is displayed. Therefore, links 77 to subsequent directory Web pages of the directory index may be used and are useful to add still further supplier links without slowing page-loading time.

The surprising result achieved by the synergistic combination of having: a goods and/or services descriptive domain name; a goods and/or services descriptive term in the header; a first paragraph of text that discusses the goods and/or services of the directory; the numerous links to Web sites of suppliers who offer goods and/or services of the directory on the first page of the directory Web site; and the rollover window, is a very content-rich directory Web site that consistently gets highly ranked by conventional search engines when a user enters a search strategy substantially corresponding to the description of the goods and services index by a given directory Web site. The high ranking is due primarily to the repeated use of descriptive keywords in numerous locations and the multiple external links to the Web sites of suppliers who offer the type of goods or services indexed by the directory Web site.

Optionally, in addition to the elements described above, a directory Web site constructed according to the present invention may include any number of descriptive terms that are related to the directory Web site in the directory Web site's metatags. The metatags attempt to cover all possible related product searches and increase the ranking achieved when a user does an initial search on a search engine that utilizes an algorithm, which takes into account metatags. The metatags may be present within, outside or both within and outside of the source code for the title portion of the directory Web site.

As seen in FIG. 2, the directory Web site also preferably contains a link 24 from each directory to the home page. This link allows a user who locates a directory using a conventional search engine to easily locate other directories corresponding to other goods and services by viewing the home page. The home page provides an overall index of directory Web sites. As shown in FIG. 4, the homepage or overall goods and services index of directories 4 may optionally include any number of informational links 55, which when activated, links a user to a web page that provides any information or service the user might find helpful. For example, the informational links may access a web page having multiple links that provide for customer assistance and feedback, helpful search tips, resources and term definitions for the user, industry associations, and industrial articles and online magazines relating to services or goods found on the homepage or overall goods and services index of directories 4, trade resources, material property data information Web page(s), industry directories, or other links of general interest to a user viewing the subject matter of the original directory Web page that provided the link to the informational Web site. Conceivably, these links could be provided on the directory Web site, but typically are not due to space constraints, but links to more popular Web pages that would typically be included on the informational Web site can be included on the directory Web site and/or the informational Web site. The informational links may optionally access a web page having multiple links further organized by categories of the services and goods offered, wherein the activation of one of these links may then direct the user to a web page containing links that provide for customer assistance and feedback, helpful search tips, resources and term definitions for the user, or industry associations and articles relating to services or goods found on the homepage relating to the category of services or goods.

As discussed above, the directory Web site may contain links to related directory Web sites, Web sites providing general information about the goods and/or services that are the subject of the directory Web sites, trade associations, etc., and/or a link to an informational Web site. The initial directory Web site is the directory Web site initially accessed by the user. When the initial directory Web site contains links to related directory Web sites, the links are typically positioned predominantly at the top of the initial directory Web site either in the form of tabs or a list of related links. The predominant position provides notice of related directory Web sites that may be of interest to the user. The related directory Web sites typically include any combination of directory Web sites of a common type of service or goods and/or other directory Web sites frequently visited or requested by the users who access the directory Web site.

Figure 5:
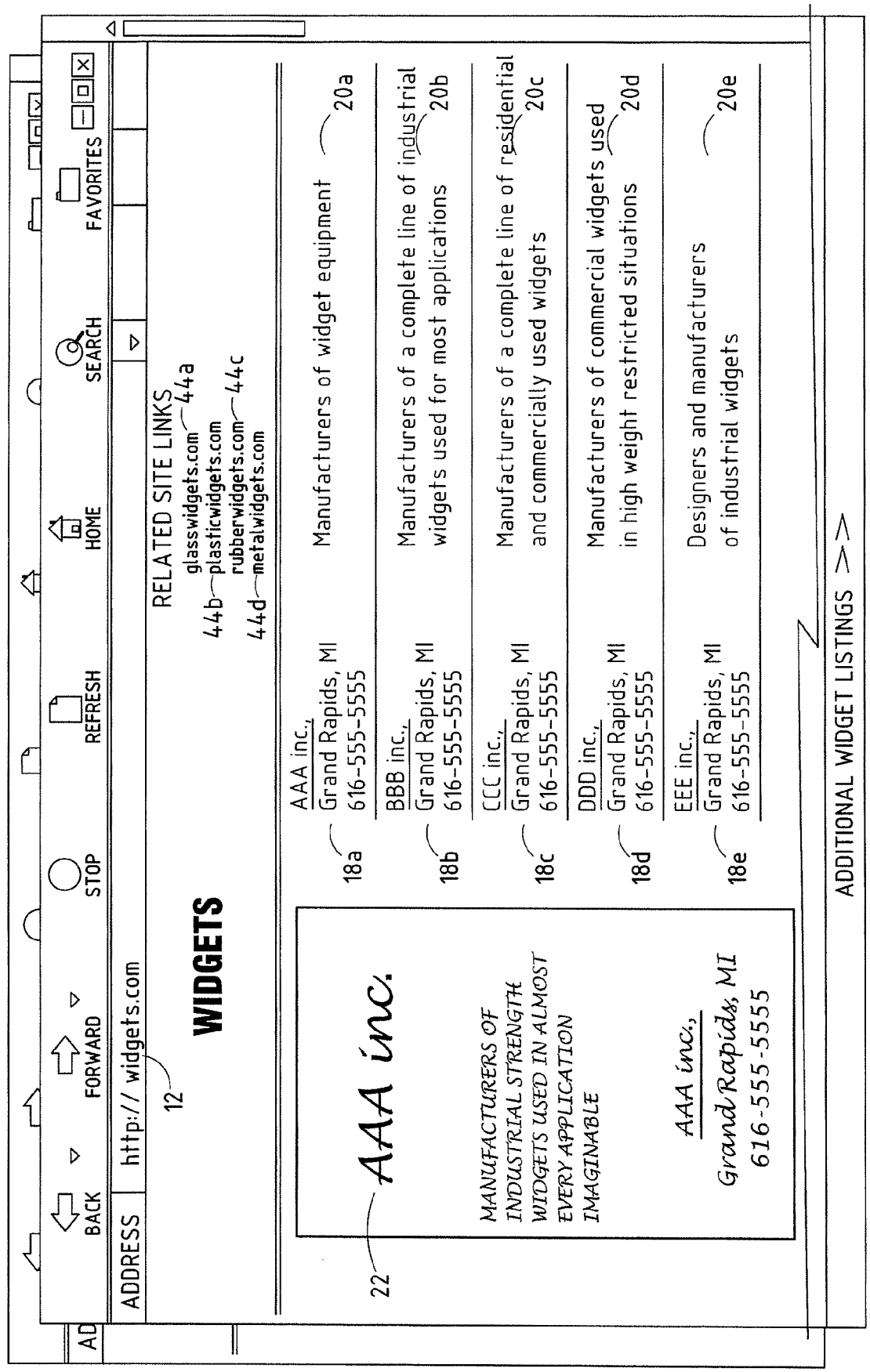
FIG. 5 shows another embodiment of a main directory page according to the present invention.

Also, for sites that have a particularly broad category of goods and/or services, it may be advantageous to employ additional related directory Web sites that further narrow the description of the goods or services by constructing one or more related directory Web sites typically configured as discussed above, which would be directed toward a particular sub-category of goods or services of the main directory Web site page (widgets in the example of FIG. 7). The related directory Web sites could, for example, be a directory Web site directed toward glass widgets, plastic widgets, rubber widgets, and/or metal widgets as shown in FIG. 7. Each of these related directory Web sites could be accessible from the general directory Web site. Typically, as shown in FIGS. 5-6 the related directory Web sites are accessible by activating the links 44a, 44b, 44c, 44d, etc., to the related directory Web sites. The links to the related directory Web sites are typically configured as tabs, as shown in FIG. 6, across the top of the directory Web site or as separate related links near the top of a general directory Web site, as shown in FIG. 5, but could be displayed in any manner. The use of the related directory Web sites may allow each related directory Web site to enhance the ranking of the general category directory Web site and also enables the related directory Web site to be more highly ranked on a search engine because the at least partially descriptive domain name, header, and first paragraph portion or first text section 16 as well as the particular suppliers are more narrowly focused on the particular sub-category of goods or services being indexed.

This type of general directory Web site and related directory Web site may also assists in ranking both of the sites due to the vertical integration of the sub-directory Web sites within the general directory Web site.

Figure 3:
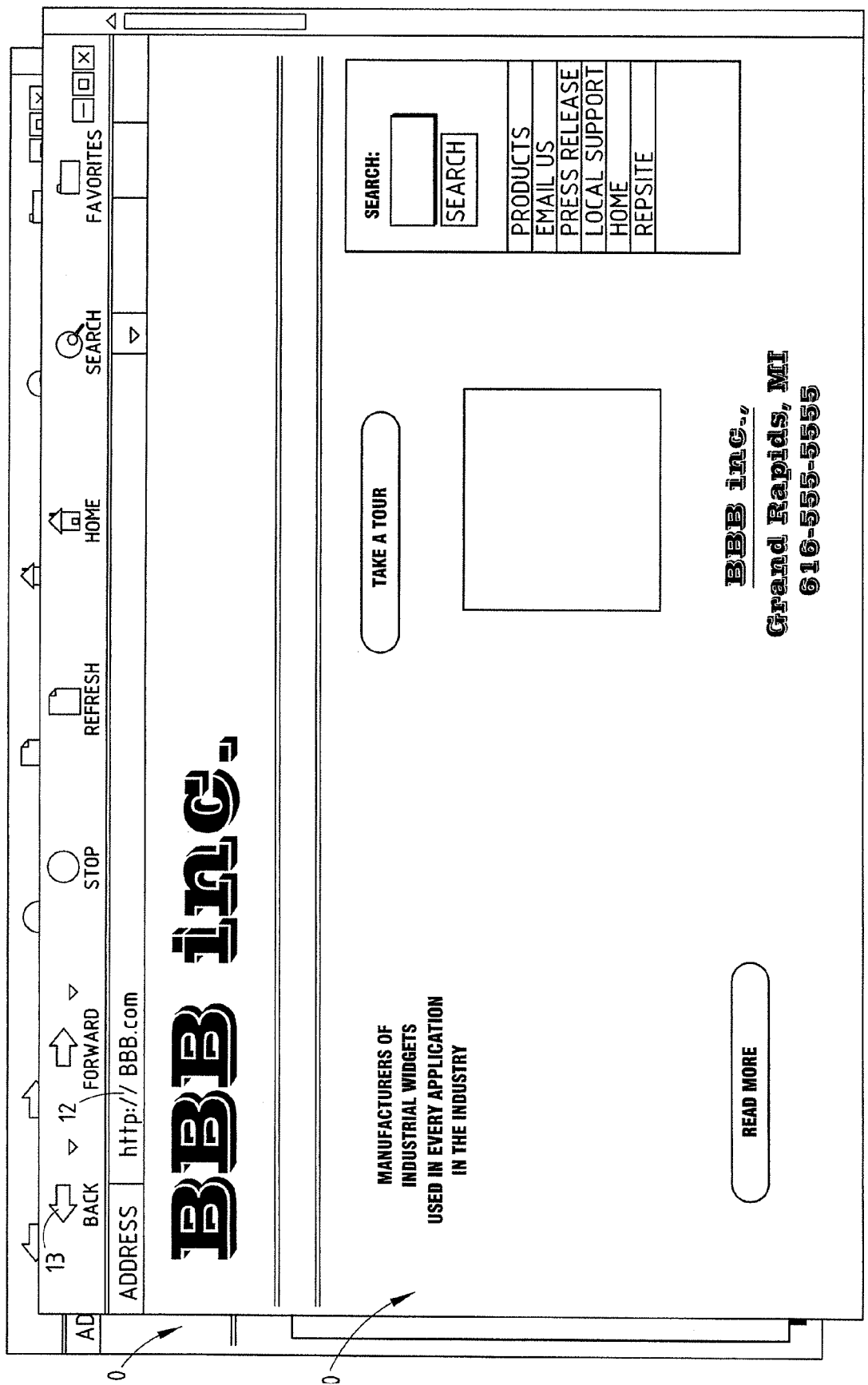
FIG. 3 shows a subsequent window according to an embodiment of the present invention displaying a supplier's Web site while the separate directory Internet browser window remains open.

Once a specific goods or services directory desired by the user is located using a conventional search engine or accessed directly if the site directory is already known to the user, the particular layout of the general aspects of the present invention allow a user to quickly and readily search through the information contained on the directory Web site. As seen in FIG. 3, in addition to providing the rollover window 22, which provides added supplier information when the user pre-selects the link by placing his/her cursor over a given link, if the user activates the link to a specific goods or services provider listed in the directory, a separate internet browser window appears 30. This separate window allows the user to navigate through this potential supplier's Web site while easily returning to the directory page by simply closing the new window 30 or selecting the still active separate Internet browser window, which continues to display the directory Web site. This setup eliminates the need to press the "back" link 13 on a browser to return to the directory Web site. Moreover, any number of such extra windows 30 may be open at any one time such that the user may view the Web sites of many suppliers of a good or service at any given time. This allows a user to quickly and easily narrow down the particular supplier he/she wishes to choose to contact regarding providing him/her with the goods or services he/she requires. Moreover, since the supplier's Web site appears within a new Internet browser window, closing the new Internet browser window that displays the supplier's site automatically returns the user to the Internet browser window that displays the directory Web site. This feature is unlike conventional search engines where, if the user closes the browser containing the supplier's Web site where the supplier's Web site is being displayed, one must reopen and return to the search engine.

The index web page of overall goods and/or services or "homepage" 4 as well as the directory Web sites may also optionally provide a keyword search function. A database contains a keyword list for each linked directory Web site. The keyword search function references the keyword list for matching words. The Web site that has the highest count of matches is listed first. Subsequent Web sites are typically listed in order of the next highest count of matches. When a user enters a phrase consisting of two words or more, the search function references the keyword list for each word individually. Each keyword match to a Web site is typically counted. Similar to a single word search, the Web site that has the highest count of matches is listed first and each subsequent Web site is listed in order of the next highest count of matches. The keyword search function may optionally also provide an exact phrase match option. When a user chooses this option, the keyword search function references the keyword list for the exact phrase as a whole rather than each word individually. The Web site with the highest count of matches for the exact phrase is listed first. Subsequent Web sites are listed in order of the next highest count of matches.

The directory Web sites, according to the present invention, may also provide a location or regional search function. Typically, a supplier is assigned a location or region code in the database based on what zip code, state(s) or other region the supplier is located. This may be customized to any type of region or location based upon various information or data. The directory Web site may provide a link to a Web site that displays a map showing the divisional lines between selected regions. The map may display any suitable location or region. When the user selects a particular location or region, the search function references the database for all suppliers that have been assigned the corresponding identifier. With reference to FIG. 4, this regional or location search function could also be achieved using an input receiving location or area 66 where a user inputs location identifying data, which may then be used to operate a listing of the goods and/or service providers in the region or location or the supplier(s) located the closest to the region or location data entered by the user. The data entered by the user may be any region, address, zip code, area code, or other data appropriate to an industry.

In another alternative format, the regional search function may allow a user to select a desired region from a list of regions provided on the directory Web site. Each supplier is typically assigned to one or more of the regions, typically regions where the supplier does business or has a business presence. The regional search function references the database for the suppliers assigned to the desired region in the same manner as when an area map display is utilized. As discussed above, typically, when the results are displayed (they can be displayed in a separate "pop up" window or within the same browser window), suppliers paying the most for advertising are listed first to provide greater incentives to those advertisers. Typically, the regional search results filter goods and services providers from all levels/tiers of the directory Web site.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of displaying a web page containing links that relate to a keyword search from a user wherein the web page has a listing of a plurality of related subject matter links wherein a web site is provided by a server accessible by the user via the Internet to the user using a computer and an associated processor associated with the computer and identifying information of interest to the user available to the user over the Internet comprising:

using the computer and the associated processor to access and display a home page on a server accessible by the user using a computer via the Internet wherein the home page comprises an input receiving area where a user inputs keyword search term information into the input receiving area;

inputting keyword search term information into the input receiving area using at least one computer input device;

accessing and displaying a keyword results displaying web page on a server accessible by the user via the Internet that displays the plurality of related subject matter links based upon the keyword search term information inputted into the input receiving area, wherein the keyword results displaying web page comprises:

the plurality of related subject matter links to web sites that are also related to the keyword search term information inputted into the input receiving area and wherein the plurality of related subject matter links are listed vertically;

a plurality of descriptive portions, wherein each descriptive portion is an associated descriptive portion that is adjacent to and associated by the user with an associated related subject matter link, which is one of the plurality of related subject matter links; and a rollover viewing area that individually displays information corresponding to more than one of the related subject matter links in the same rollover viewing area wherein the rollover viewing area is located substantially adjacent to the plurality of related subject matter links and along a side of the web page.

2. The method of claim 1, wherein the plurality of related subject matter links to web sites are a plurality of supplier links offering goods or services from a class of goods or services.

3. The method of claim 2, wherein the keyword results displaying web page and the home page are stored on the server.

4. The method of claim 3, wherein the keyword results displaying web page has an internet address and a portion of the internet address describes the related subject matter of the related subject matter links.

5. The method of claim 1, wherein the keyword results displaying web page has an internet address and a portion of the internet address textually describes a related subject matter of each of the related subject matter links.

6. The method of claim 5, wherein the related subject matter links are supplier links who offer a good or service of a class of good or service described by the portion of the internet address textually describing the related subject matter.

7. The method of claim 6, wherein the internet address has a domain name portion and the domain name portion of the internet address describes the related subject matter of the keyword results displaying web page.

8. The method of claim 6, wherein the plurality of descriptive portions are a plurality of supplier descriptive portions where each portion provides a description of one or more of an associated suppliers' goods or services.

9. The method of claim 6, wherein the keyword results displaying web page includes a descriptive title portion in a header that describes a class of good or service that is a subject matter of the supplier links.

10. The method of claim 7, wherein the rollover viewing area is a rollover window and the rollover window has a border.

11. The method of claim 5, wherein the internet address has a domain name portion and the domain name portion of the internet address textually describes the related subject matter of the keyword results displaying web page.

12. The method of claim 11, wherein the rollover viewing area is a rollover window and the rollover window has a border.

13. The method of claim 5, wherein the descriptive portions being displayed and the rollover viewing area are both visible to the user.

14. The method of claim 1, wherein the entirety of the descriptive portions being displayed to the user and the rollover viewing area are both visible to the user.

15. The method of claim 1, wherein the keyword results displaying web page and the home page are stored on the server and wherein the rollover viewing area is further located along a side of the web page.

16. A computer system including a server comprising:

at least one web site stored on the server and accessible by a user via the Internet, wherein the web site comprises a keyword results displaying web page that comprises:

a vertical listing of a plurality of related subject matter links to web sites that are directed to related subject matter information selected by the user;

a plurality of descriptive portions, wherein each descriptive portion is an associated descriptive portion that is adjacent to and associated by the user with an associated related subject matter link, which is one of the plurality of related subject matter links; and a rollover viewing area that individually displays information corresponding to more than one of the related subject matter links in the same rollover viewing area when the user's cursor is at least substantially over any of the links, at least substantially over a link's descriptive portion, or substantially adjacent the corresponding descriptive portion and wherein the rollover viewing area is located substantially adjacent to the plurality of related subject matter links.

17. The computer system including a server of claim 16, wherein the rollover viewing area is further located along a side of the web page.

18. The computer system including a server of claim 17, wherein the plurality of related subject matter links to web sites are a plurality of supplier links offering goods or services from a class of goods or services and wherein the web site has an internet address, the internet address has a domain name portion, and the domain name portion of the internet address describes the related subject matter of the keyword results displaying web page.

19. A computer system including a server comprising:
   at least one web site stored on the server and accessible by a user via the Internet, wherein the web site comprises:
   a home page on the server accessible by the user using a computer via the Internet wherein the home page comprises an input receiving area and wherein a user inputs keyword search term information into the input receiving area;
   a keyword results displaying web page that comprises:
      a listing of a plurality of related subject matter links to web sites that are also related to the keyword search term information inputted into the input receiving area;
      a plurality of descriptive portions, wherein each descriptive portion is an associated descriptive portion that is adjacent to and associated by the user with an associated related subject matter link, which is one of the plurality of related subject matter links; and
      a rollover viewing area that individually displays information corresponding to more than one of the related subject matter links in the same rollover viewing area when the user's cursor is at least substantially over any of the links, at least substantially over a link's descriptive portion, or substantially adjacent the corresponding descriptive portion and wherein the rollover viewing area is located substantially adjacent to the plurality of related subject matter links.

20. The method of claim 19, wherein the rollover viewing area is further located along a side of the key word result displaying web page.

* * * * *